United States Patent
Williams et al.

(10) Patent No.: US 8,789,159 B2
(45) Date of Patent: Jul. 22, 2014

(54) SYSTEM FOR RUNNING POTENTIALLY MALICIOUS CODE

(75) Inventors: S. Franklin Williams, Seattle, WA (US); Kiran Akella Venkata, Redmond, WA (US); David C. LeBlanc, Monroe, WA (US); Juraj Gottweis, Bellevue, WA (US); Gareth A. Howell, Kirkland, WA (US); Scott A. Field, Redmond, WA (US); Ramesh Chinta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1319 days.

(21) Appl. No.: 12/029,168

(22) Filed: Feb. 11, 2008

(65) Prior Publication Data
US 2009/0205034 A1    Aug. 13, 2009

(51) Int. Cl.
*G06F 15/16* (2006.01)
*G06F 21/53* (2013.01)

(52) U.S. Cl.
CPC ..................................... *G06F 21/53* (2013.01)
USPC .......... 726/9; 726/30; 726/2; 726/1; 713/185; 713/171; 709/249

(58) Field of Classification Search
USPC .................. 726/22–26, 3–9, 2; 713/159–161, 713/182–185; 709/229
See application file for complete search history.

(56) References Cited

U.S. PATENT DOCUMENTS

| | | | |
|---|---|---|---|
| 5,892,904 A | | 4/1999 | Atkinson et al. |
| 6,167,522 A | | 12/2000 | Lee et al. |
| 6,980,989 B2 * | | 12/2005 | Silverman et al. ..................... 1/1 |
| 7,058,822 B2 | | 6/2006 | Edery et al. |
| 7,137,145 B2 | | 11/2006 | Gleichauf |
| 7,444,644 B1 * | | 10/2008 | Slaughter et al. ............. 719/315 |
| 7,539,722 B2 * | | 5/2009 | Mohamed et al. ............ 709/203 |
| 7,716,492 B1 * | | 5/2010 | Saulpaugh et al. ........... 713/185 |
| 7,805,532 B2 * | | 9/2010 | Pattison et al. ............... 709/230 |
| 8,006,098 B2 * | | 8/2011 | Aupperle et al. ............. 713/185 |
| 8,032,558 B2 * | | 10/2011 | Carter et al. .................. 707/786 |
| 8,166,554 B2 * | | 4/2012 | John .............................. 726/26 |
| 8,489,677 B2 * | | 7/2013 | Lategan ........................ 709/203 |
| 8,516,582 B2 * | | 8/2013 | Thorley et al. .................. 726/22 |
| 8,543,982 B2 * | | 9/2013 | Zeanah et al. ................ 717/125 |
| 2003/0014622 A1 * | | 1/2003 | Larvoire .......................... 713/2 |
| 2004/0083479 A1 * | | 4/2004 | Bondarenko et al. ......... 719/310 |
| 2004/0098595 A1 * | | 5/2004 | Aupperle et al. ............. 713/185 |
| 2004/0123117 A1 | | 6/2004 | Berger |

(Continued)

OTHER PUBLICATIONS

White BS, Secure and Scalable File System Supporting Cross Domain High-Performance Applicaitons, Nov. 2001, IEEE, vol. 10, pp. 1-10.*

(Continued)

*Primary Examiner* — Shin-Hon Chen
*Assistant Examiner* — Viral Lakhia
(74) *Attorney, Agent, or Firm* — Steve Crocker; Jim Ross; Micky Minhas (57) ABSTRACT

Systems and methods for creating a secure process on a web server can include creating an application manager process, and creating an application host process, the application host process being created under control of the application manager process. Example methods can also include restricting attributes of the application host process, and assigning a unique logon identifier to the application host process so that the application host process can only communicate with the application manager process.

16 Claims, 9 Drawing Sheets

(56) References Cited

U.S. PATENT DOCUMENTS

| | | |
|---|---|---|
| 2004/0133777 A1 | 7/2004 | Kiriansky et al. |
| 2005/0091212 A1* | 4/2005 | Mohamed et al. ............... 707/9 |
| 2005/0102536 A1* | 5/2005 | Patrick et al. ............... 713/201 |
| 2006/0150256 A1 | 7/2006 | Fanton et al. |
| 2006/0161982 A1 | 7/2006 | Chari et al. |
| 2006/0168260 A1* | 7/2006 | Hinde et al. ............... 709/229 |
| 2006/0230454 A1 | 10/2006 | Achanta et al. |
| 2006/0259954 A1* | 11/2006 | Patrick ............... 726/2 |
| 2007/0043954 A1* | 2/2007 | Fox ............... 713/185 |
| 2007/0050854 A1 | 3/2007 | Cooperstein et al. |
| 2007/0261112 A1* | 11/2007 | Todd et al. ............... 726/11 |
| 2007/0266435 A1* | 11/2007 | Williams et al. ............... 726/22 |
| 2008/0168532 A1* | 7/2008 | Carter et al. ............... 726/1 |
| 2009/0037762 A1* | 2/2009 | Gozzo et al. ............... 714/2 |
| 2009/0249488 A1* | 10/2009 | Robinson et al. ............... 726/26 |
| 2013/0019323 A1* | 1/2013 | Arvidsson et al. ............... 726/30 |

OTHER PUBLICATIONS

Adobe Flash Security and Adobe Enterprise Solutions © 2006, pp. 1-7.

Conry-Murray, Andrew; NetworkMagazine.com, Behavior-Blocking Stops Unknown Malicious Code, Jun. 5, 2002, 6 pages.

Trend Micro, InterScan™ AppletTrap™, Comprehensive Malicious Code Solution for the Enterprise, 2002; 2 pages.

* cited by examiner

SYSTEM FOR RUNNING POTENTIALLY MALICIOUS CODE

BACKGROUND

It can be desirable for web browsers to provide full-fidelity renditions of the documents. In order to provide full-fidelity renditions for some documents, a web server must run code, such a legacy code, in which the documents were written. However, such code can sometimes contain vulnerabilities that make the application subject to attack from malicious users.

SUMMARY

The present disclosure relates to systems and methods for running legacy applications and accessing files on a web server in a secure manner that minimize the risks associated with the applications and files.

In one aspect, a method for creating a secure process on a web server includes: creating an application manager process; creating an application host process, the application host process being created under control of the application manager process; restricting attributes of the application host process; and assigning a unique logon identifier to the application host process so that the application host process can only communicate with the application manager process.

In another aspect, a method for servicing a request on a server to render a document from a file includes: receiving a request for the file; processing the request for the file using an application manager process; activating an application host process from a pool of available processes, the activation of the application host process being controlled by the application manager process, the available processes in the pool of available processes having each been created with a unique logon identifier, the unique logon identifier permitting the application host process to communicate only with the application manager process; and executing an application using the application host process to render a document from the requested file.

In yet another aspect, a system for running application code on a web server includes a plurality of application host processes, and an application manager process. The application manager process further includes an application host process creation module programmed to create a pool of application host processes and to activate an application host process when required, an application host process monitor module programmed to monitor attributes of the application host processes and terminate an application host process when the attributes of the application host process exceed a predetermined limit, and a data marshal module programmed to marshal data between a file and an application host process, the data marshal module marshaling data via a file handle, the file handle having restricted access to the memory and the disk of the web server. Each of the plurality of application host processes has a unique logon identifier, the unique logon identifier permitting an application host process to communicate only with the application manager process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

The present application is directed to systems and methods for running applications and accessing files on a web server so that risks posed by potentially malicious code are minimized. In example embodiments, the files are legacy files and the applications are legacy applications, although other configurations are possible. For example, the systems and methods may also be used in other environments, such as batch conversion jobs, where a process is CPU-bound.

Figure 1:
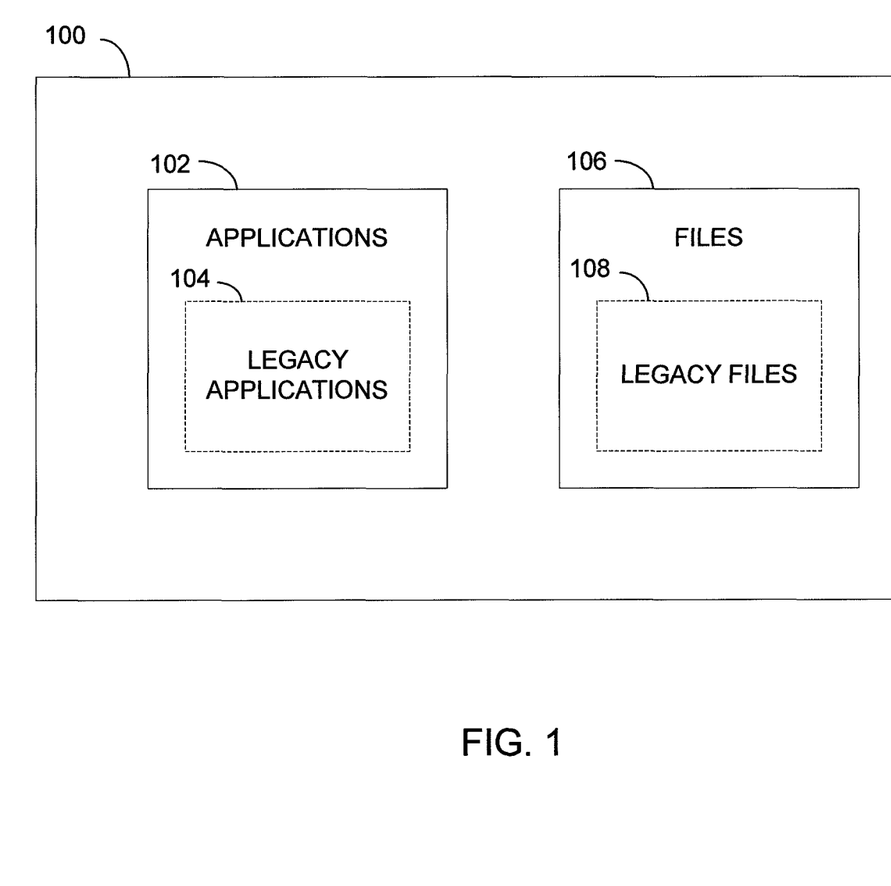
FIG. 1 shows example applications and files on an example web server.

Referring to FIG. 1, an example web server 100 contains applications 102 and files 106. An example application can be an application from the Microsoft Office Suite manufactured by Microsoft Corporation of Redmond, Wash. Examples of such applications include Microsoft Word or Microsoft EXCEL®, and an example file can be a document created using such as application. Other programs can be used. The web server 100 also contains legacy applications 104 and legacy files 108.

In some embodiments, a legacy file 108 contains features that are not supported with the current version of the application that created it. Therefore, in order to display a full-feature rendition of the legacy file 108, i.e., in order to display the document with all the features with which it was created, the web server 100 contains binaries of the legacy applications 104. For example, to display a document on a web browser that was created with an older, non-supported version of Microsoft Word, the web server executes binaries of the older non-supported Microsoft Word application.

Figure 2:
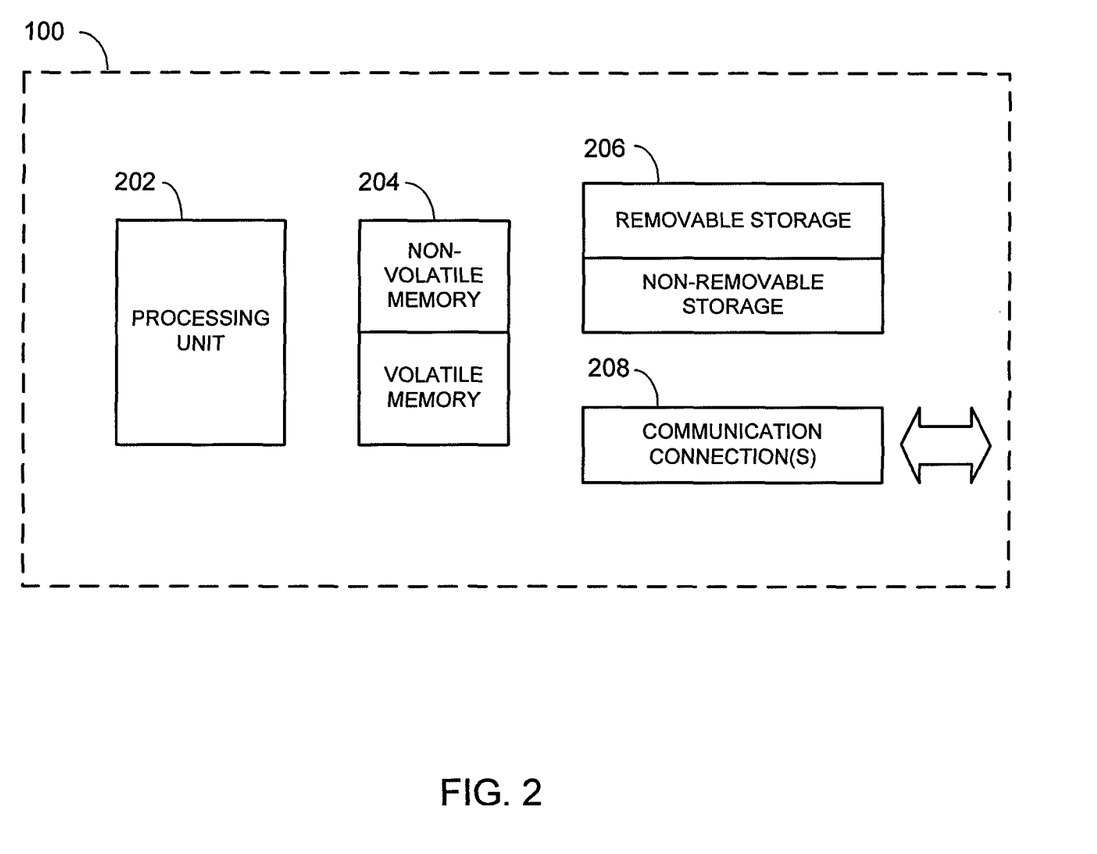
FIG. 2 shows the example web server of FIG. 1.

Referring now to FIG. 2 the example web server 100 is again shown. The web server 100 is a computer system including a processing unit 202 and computer readable media 204. Computer readable media 204 can include memory such as volatile (such as RAM), non-volatile (such as ROM, flash memory, etc.) or some combination thereof. Additionally, the web server 100 can include mass storage 206 (removable and/or non-removable) such as a magnetic or optical disks or tape. An operating system and one or more application programs can be stored on the mass storage device. The web server 100 includes communication connections 208 and can communicate with client computers through one or more networks, such as a local area network (LAN), a wide area network (WAN), the Internet, or a combination thereof. Communications can be implemented using wired and/or wireless technologies.

Figure 3:
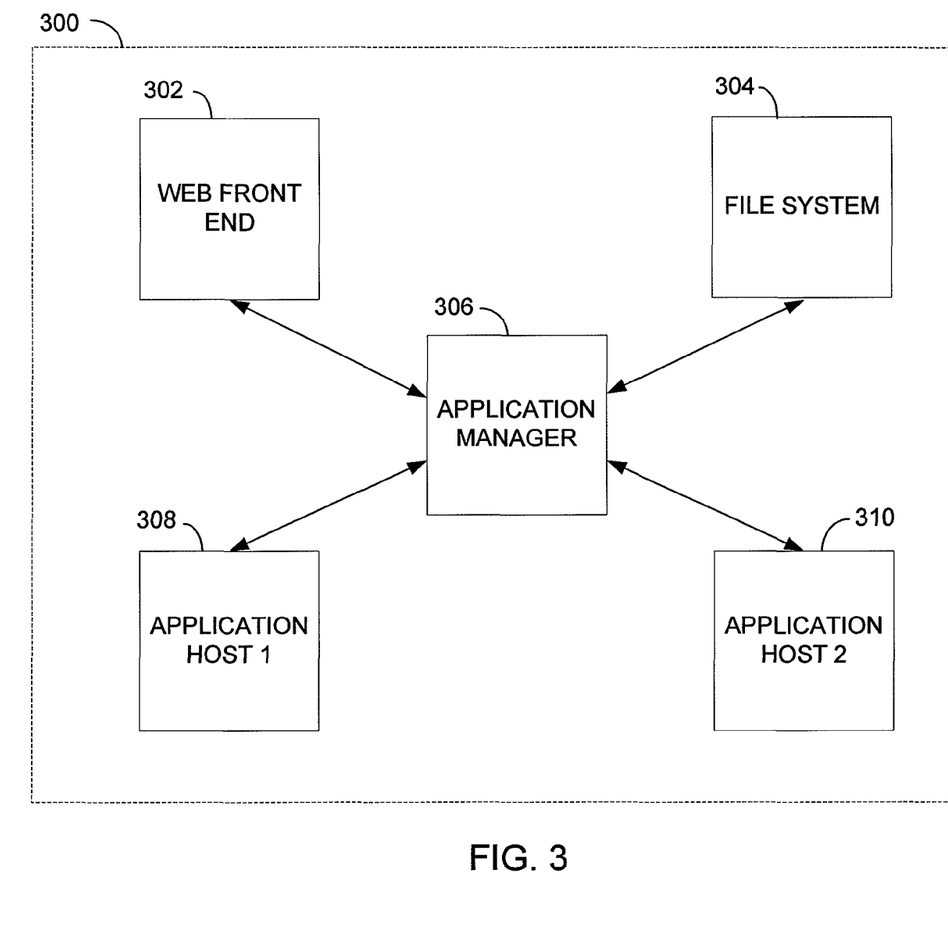
FIG. 3 shows example functional modules of an example web server that implement a secure method of obtaining and rendering legacy files on the web server.

FIG. 3 shows an example web server 300 that minimizes the vulnerabilities of legacy applications running on the web server 300. The web server 300 contains a web front end 302 that receives and process requests from web browsers to display web pages. Typically, the web front end 302 receives a Hypertext Transfer Protocol (HTTP) message with a request for a specific file from files 304 stored on the web server 300. The web server 300 obtains the requested file and transmits it to the web browser via the HTTP protocol.

To implement secure methods for processing files, the web server 300 contains an application manager 306 and a plurality of application hosts 308, 310. The application manager 306 and the application hosts 308, 310 are processes running on the web server. The application manager 306 creates and monitors the application hosts 308, 310. The application hosts are the processes in which the legacy binary applications run and to which file data is marshaled from a file store.

In the example shown in FIG. 3, the application manager 306 provides an interface between the web server front end 302, the file system 304 and application hosts 308 and 310. Everything on the web server 300 runs through the application manager 306. Thus, as shown in FIG. 3, the application manager 306 receives requests from the web server front end 302. The application manager 306 initiates requests to the file system 304 for files and receives files in response. The application manager 306 also controls the creation of the application hosts 308 and 310 and marshals data to and from them.

The application hosts 308 and 310 are processes in which any unsafe binary code can run and obtain restricted access to the surrounding environment. Application hosts are created in such a way that privileges and groups are limited. Privileges are the right of a user to perform various system-related operations, such as shutting down the system, loading device drivers, or changing the system time. Groups refer to a set of users that have common access rights. Privileges are held either by the user or the user's groups.

The application hosts are also created in such a manner that inter-process communication is restricted. An application host interacts with the application manager but is prevented from interacting with any other application host process. In this way, each application host operates in a restricted environment, sometimes referred to as a "sandbox."

Figure 4:
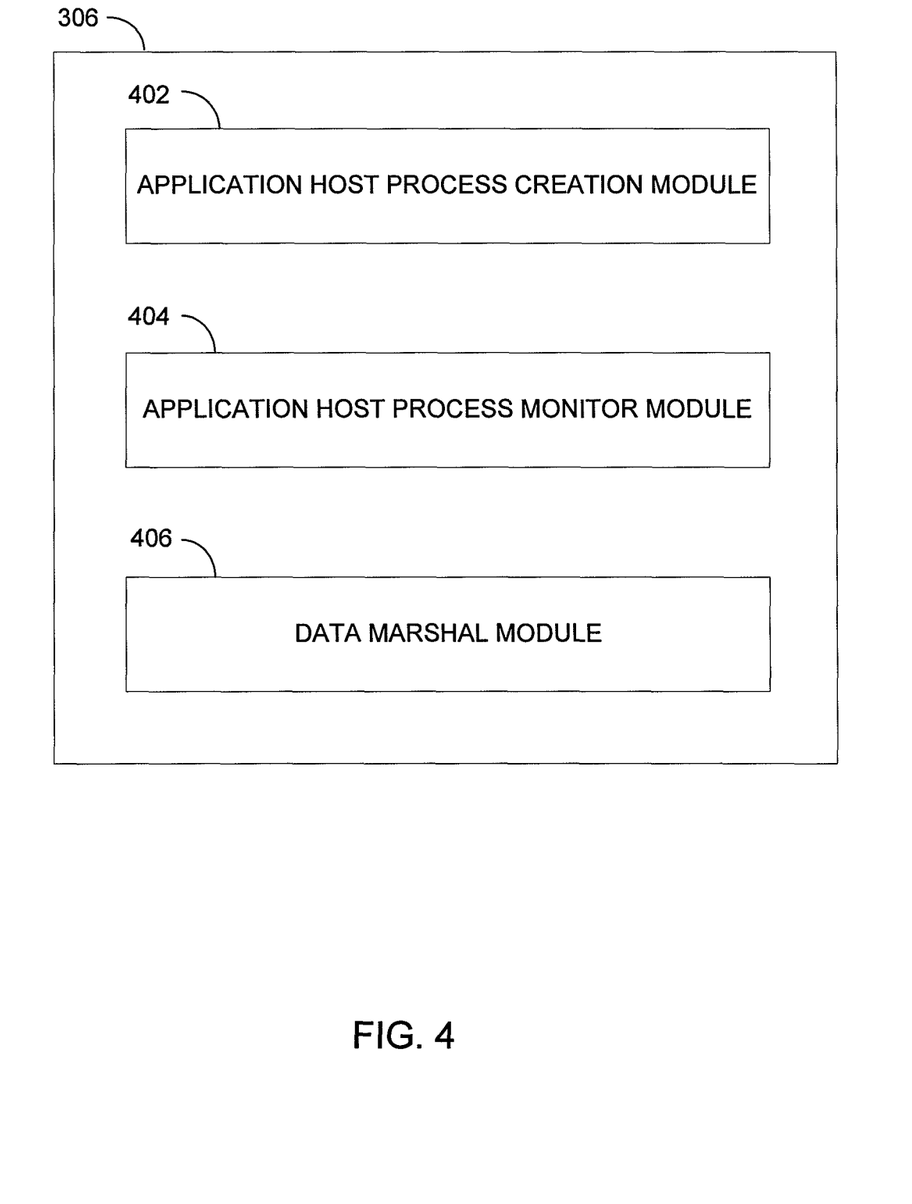
FIG. 4 shows example functions of an application manager process.

FIG. 4 shows example modules of the example application manager 306. The application manager 306 includes an application host process creation module 402 that creates a pool of application host processes. The application manager 306 also includes an application host process monitor module 404 that monitors the application hosts, determining when to activate them and when to terminate them. The application manager 306 also includes a data marshal module 406 that marshals data to and from the application hosts.

As shown in FIG. 4, the application host process creation module 402 is programmed to create a pool of application host processes. This is done to minimize the latency that could be caused by waiting for a process to be created each time a request for a file is received. Each application host process is designated as inactive until such time that it is needed. When a request is received for a file, an application host process is obtained from the pool of available processes and made active.

The application host process monitor module 404 of the application manager 306 is programmed to monitor the application hosts. To guard against malicious attacks, the application manager 306 uses several metrics to determine that the application hosts are operating properly. For example, the application manager 306 monitors each application host to verify that it is has not improperly terminated (crashed). If a crash is detected, the application manager activates a new process from the pool of available application host processes.

The application manager 306 also monitors whether the application hosts are responding in a timely manner. It does this by periodically sending requests to the application hosts. If the application manager does not receive a response from the application host within a predetermined period of time, the application manager terminates (kills) the application host and activates a new application host from the pool.

The application manager also monitors the application host using a maximum timeout period. The maximum timeout period constitutes the maximum time that the operation should run. For example, if the operation of obtaining a file and rendering a document takes longer than a predetermined time, the application manager terminates the application host and activates a new application host from the pool.

The application manager 306 also monitors the system resources that are available to the application host and terminates the application host if the system resources exceed predetermined limits. The system resources that the application manager monitors includes maximum memory usage, maximum input file size, maximum individual file output size and maximum total file size of all output files. Other system resources may be monitored.

As another way to minimize the impact of potentially malicious code, the application manager 306 recycles the application hosts after a predetermined number of renditions. A rendition comprises the application host obtaining a file and running the appropriate application code to render the document associated with the file. After a predetermined number of renditions, the application manager terminates the application and activates another application host to take its place. This limits a malicious process from accepting data indefinitely and performing malicious acts with that data. It also limits the ability of the process to access data that another process may have previously stored in memory.

The application manager 306 also monitors an application host to detect if it attempts to launch another process. If the process that is launched is not on a predetermined list of processes that the application host is authorized to launch, the application manager terminates (kills) the process. This enhances the possibility that malicious code operating on the server will not be able to launch a rogue process.

The data marshal module 406 of the application manager 306 is programmed to marshal file data to and from the application host. The application manager 306 marshals file data to a local location from which the application host can read it and then marshals the file data back from this local location. When marshalling data, the application manager obtains a file handle for the file and then creates a duplicate file handle. The application manager provides the duplicate file handle to the application host and the application host uses the duplicate file handle. The application host can only write to the duplicate file handle that it gets from the application manager. The application host cannot write to the disk. The application host thereby has limited access to the resources on the web server 300. In this manner, application hosts 308 and 310 do not have access to a network, does not have access to the registry, cannot issue messages to the default Windows desktop and cannot communicate with other application host processes.

Figure 5:
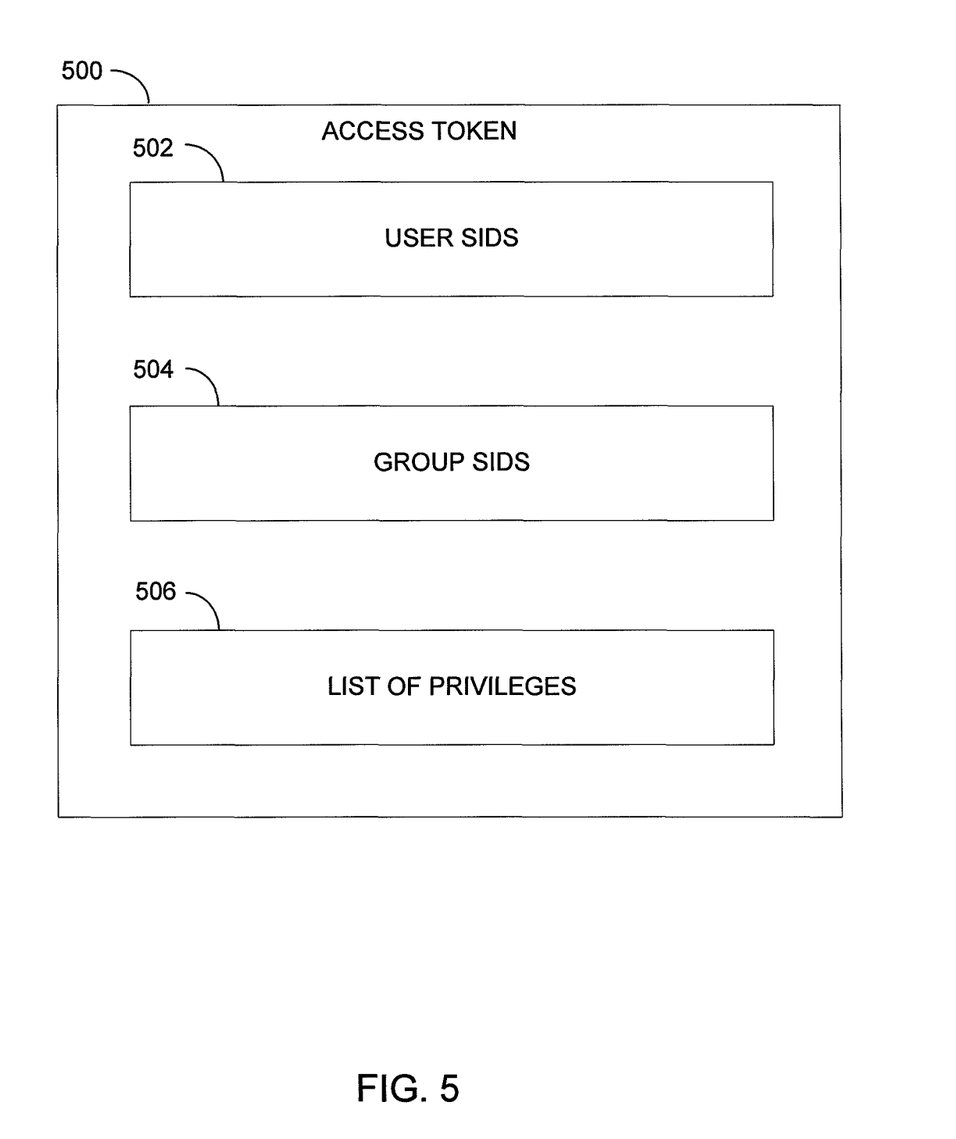
FIG. 5 shows an example access token.
Figure 6:
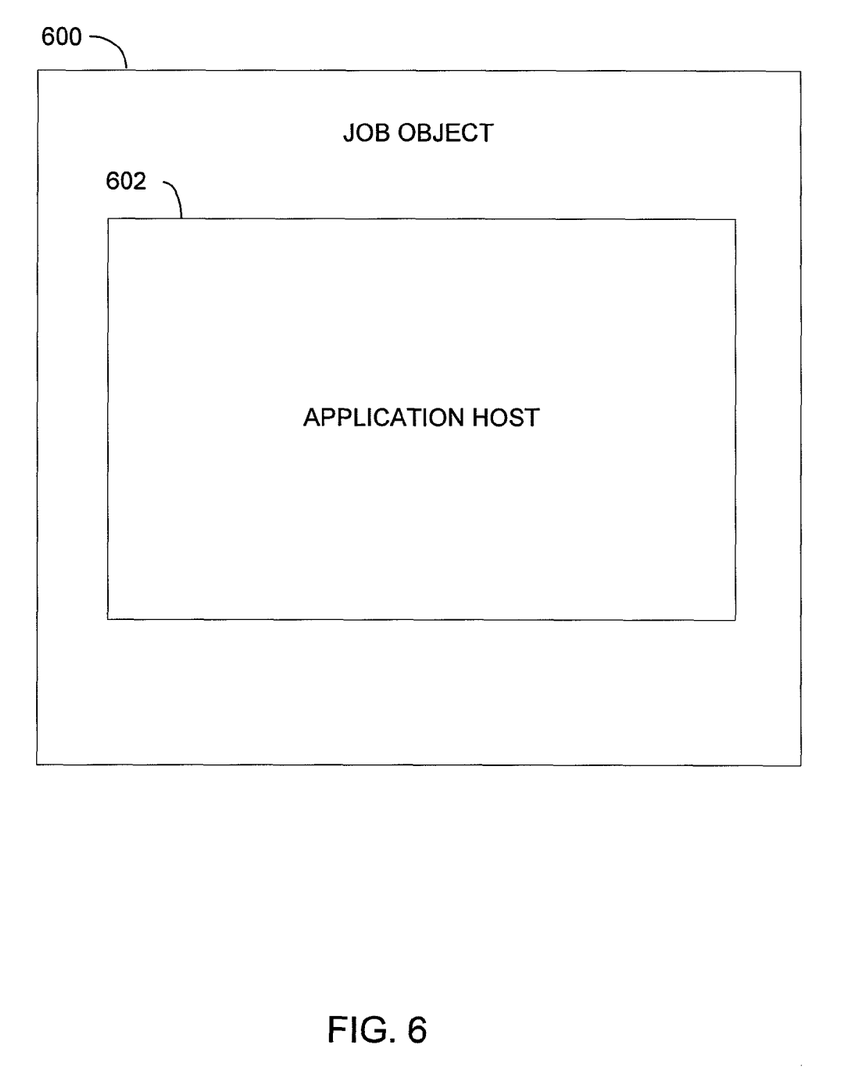
FIG. 6 shows an example job object wrapped around an example application manager process.
Figure 7:
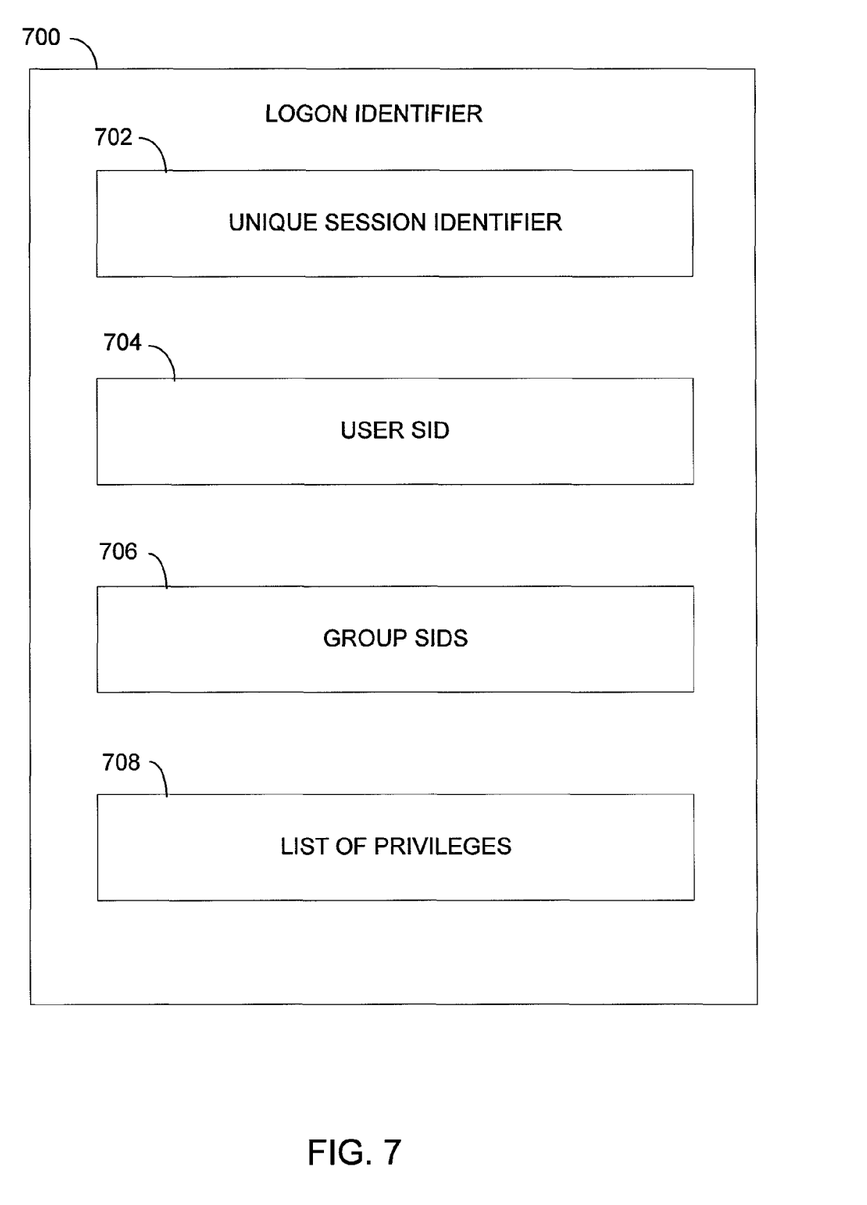
FIG. 7 shows an example logon identifier.

Referring now to FIGS. 5-7, in example embodiments, to achieve the security features described above, the application host is implemented by 1) using a restricted access token, 2) by wrapping the application host process in a job object and 3) by replacing the security identifier of the application host with a unique logon security identifier.

An access token 500, shown in FIG. 5, contains the security information for a logon session. The access token identifies the user, the user's groups and the user's privileges. The user is identified by user security identifiers (SIDs) 502. The user's groups are identified by group SIDs 504 and the user's privileges are identified by privilege list 506. When the application manager creates an application host process, it uses a function, for example the Microsoft Windows API function CreateRestrictedToken, to create a restricted version of the existing access token. The restricted access token limits the users, groups and privileges of the application host.

A job object 600, shown in FIG. 6, controls the attributes of the processes associated with them. By creating a job object and then associating a process with the job object, certain parameters of the process can be constrained. For example, a job object can be created with the Microsoft Windows API function CreateJobObject. Similarly, a process can be assigned to a job object using the Microsoft Windows API function AssignProcessToJobObject. For example, after the application manager 206, creates the application host process 602, it creates a job object 600 and assigns the application host process 602 to it. When a job object is created and application host is assigned to it, the application host can be further constrained. For example, if it were determined that the application host process can use no more than 5 MB of memory, the job object can be created with a 5 MB limit. Then, if the application host used more than 5 MB of memory, the application manager terminates the application host.

A logon session is identified by a logon identifier 700, shown in FIG. 7. The logon identifier 700 identifies the groups 706 and privileges 708 available to a user 704. The logon identifier also contains a unique session identifier 702 for the logon session. After the application manager creates the application host and wraps it in a job object, the application manager runs the job object through a logon function, for example the Microsoft Windows API function LogonUser. The logon function creates a copy of the application host and creates a unique logon identifier for the application host. This copy of the application host is then restricted further by removing groups and privileges. The result is an application host with restricted groups and privileges that is different from the original application host because it has a different logon identifier. For example, if the user has another process running on the server, the application host does not have access to it, even though the processes are owned by the same user. In this way, an application host is prevented from interacting with any other application host, thereby minimizing the damage that the application host can do on the server.

Figure 8:
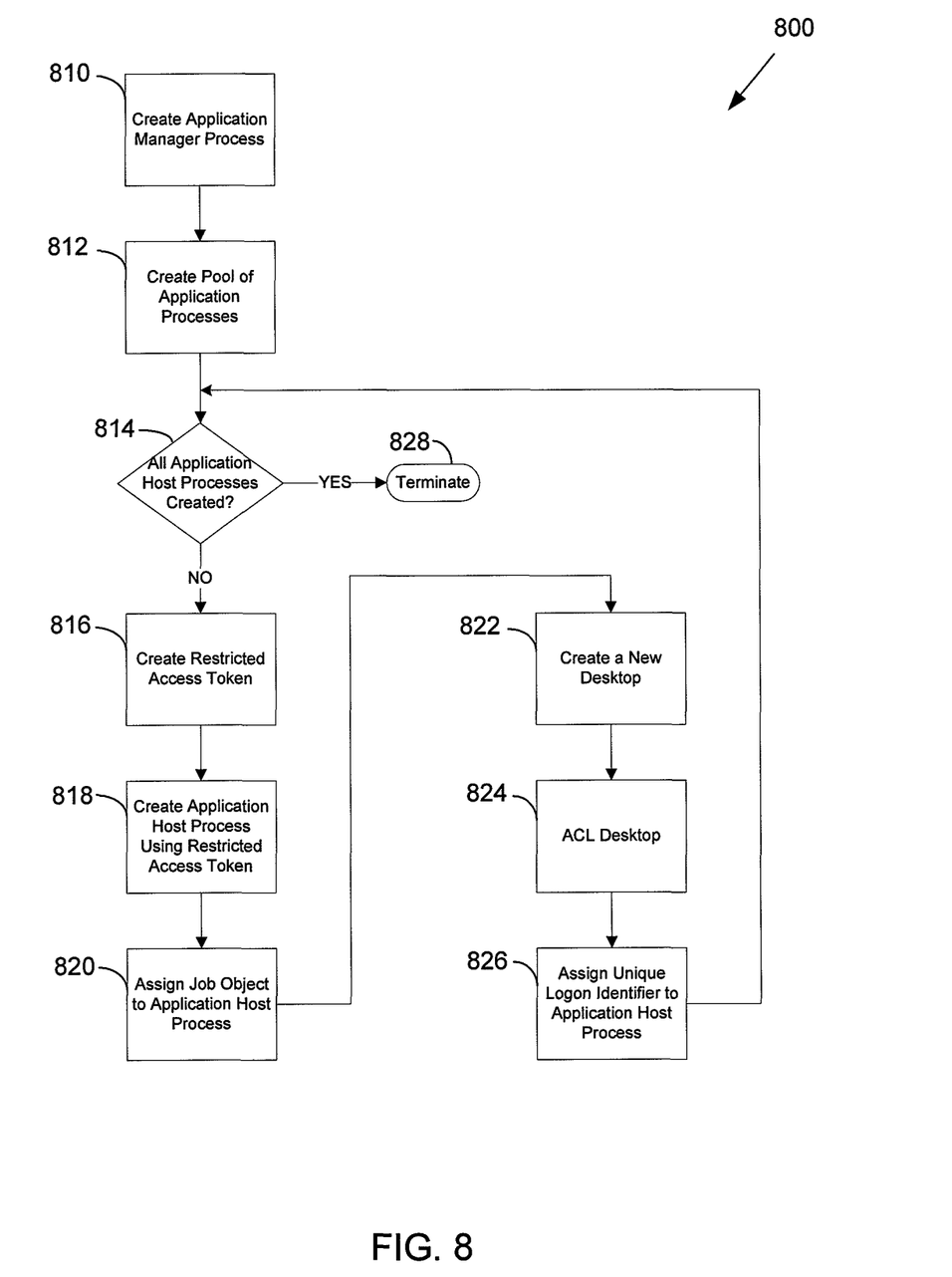
FIG. 8 shows an example method for creating a secure process for obtaining and rendering legacy files on a web server.

FIG. 8 illustrates an example method 800 of creating a secure application host on a server, such as web server 300 described above. At operation 810, an application manager is created on the server. Next, for each registered application on the server, the application manager at operation 812 creates a pool of application processes. The application manager then creates application hosts for each process in the application pool. At operation 814 the application manager checks if there are application processes available that haven't yet been converted into application hosts. If application host processes still need to be created, at operation 816 the application manager executes a function that creates a restricted token. At operation 818, the application manager creates an application host using the restricted token. The application host is started in suspended mode.

Next, at operation 820 a job object is created and assigned to the application host. The job object constrains attributes of the application host, for example memory limitations, that cannot be constrained with a restricted token alone.

To enhance security, the application host runs on an isolated desktop-window station pair. To implement this, a new desktop and window station are created at operation 822. Then, at operation 834, an access control list (ACL) is assigned to the application host to restrict it to the desktop. The access control list specifies who or what is allowed to access the application host and what operations are permitted to be performed on it.

To further enhance security and to ensure that application hosts do not interact with each other, at operation 826 a logon process is applied to each application host. The logon process creates a unique logon identifier for the application host. Because each process only has access to its granted logon identifier, the application hosts have no access to each other.

After a unique logon identifier has been assign to the application host, control returns to operation 814. If there are available application processes that have not been converted into application hosts, control advances to operation 816 to obtain a restricted token and then create a new application host. If all available application processes have been converted into application hosts, control terminates at operation 828.

Figure 9:
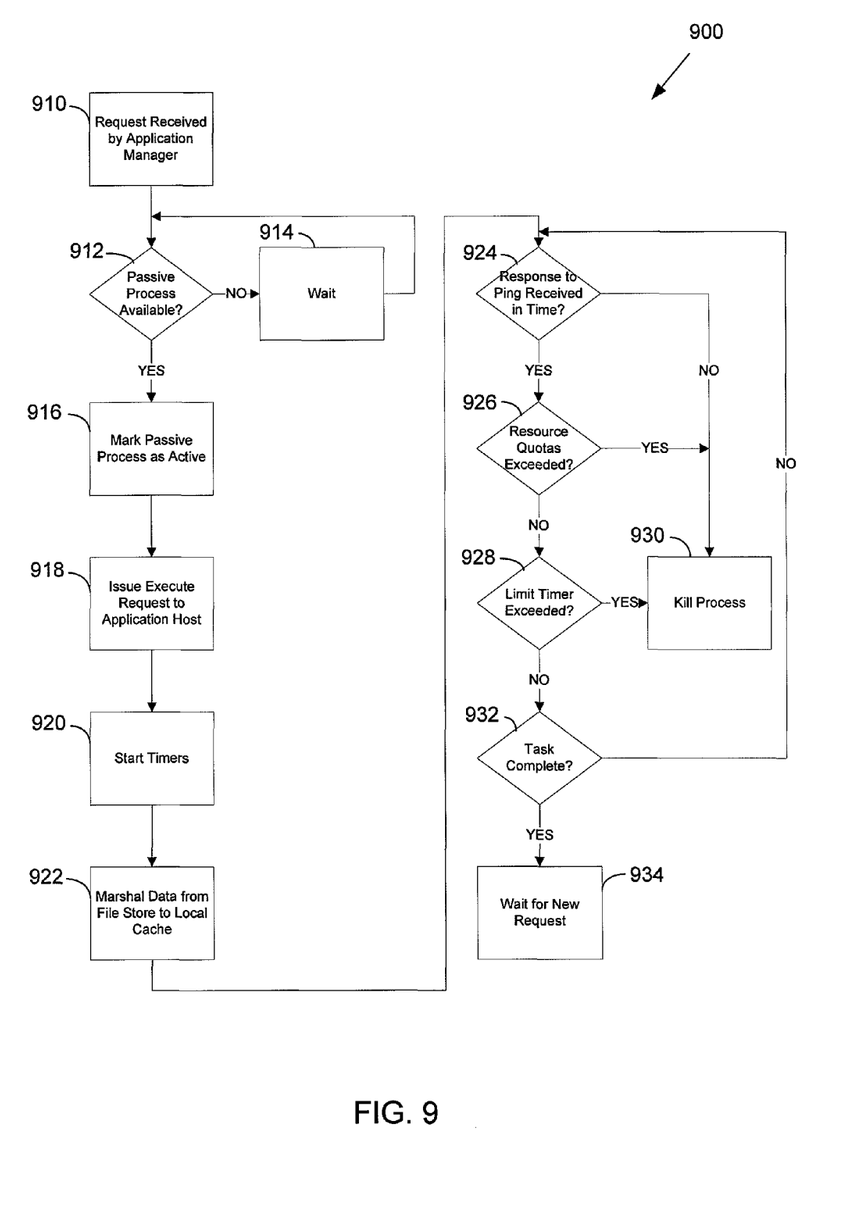
FIG. 9 shows an example method for receiving a request for a file on a web server and monitoring the process for obtaining and rendering the file.

FIG. 9 illustrates an example method 900 for receiving a request for a file at the application manager and for monitoring the application host as the file is obtained and rendered. At operation 910, a request for a file is received at the application manager. The request is typically forwarded to the application manager from the web server front end interface. The application manager then seeks to obtain an application host to process the file in a secure manner. At operation 912, the application manager checks the pool of application hosts to determine if there is a passive application host available. If there is, the application manager marks the application host as active at operation 916. If there are not any passive application hosts available (i.e., all available application hosts are used and marked as active), the application manager waits a specified period of time at operation 914 until a passive application host becomes available.

At operation 918, the application manager issues an execute request for the application host to obtain the file and to run the application binary code that will render the document associated with the file. At operation 920, the application manager starts a timer to periodically ping the application host to determine whether it is alive and it also starts a limit timer that provides a maximum time in which the execute operation must be completed.

At operation 922, the application host obtains the file from where it is stored on the server or at a remote location and copies it to a local cache. This is done by marshalling the data via a file handle so that the application host can only write to the file handle.

While file data is being marshaled to local cache at operation at 922, the application manager monitors the operation. For example, at operation 924, the application manager checks whether the application host has responded within a specified time to the ping sent to it at operation 920. If the application host does not respond before the timer set at operation 920 times out, the application manager terminates the application host at operation 930. At operation 926, the application manager monitors system resources and determines if any of them have been exceeded. If system resources have been exceeded, the application manager terminates the application host at operation 930. In addition, if a limit timer 928 times out, indicating that the time for the operation of marshalling data from the remote store to local cache took longer than a predetermined limit, the application manager terminates the application host at operation 930.

As part of monitoring the marshaling of file data, at operation 932, the application manager checks if the marshaling task is complete. If the task is complete, the application manager waits for a new request to render a document at operation 934. If the task is not complete, control returns to operation 924 to continue the monitoring process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for creating a secure process on a web server, the method comprising:
    creating an application manager process, the application manager process obtaining a first file handle for a file;
    creating a second file handle for the file, the second file handle being a duplicate of the first file handle, the second file handle having restricted access to memory of the web server;
    creating a plurality of application host processes, each of the plurality of the application host processes being created under control of the application manager process;
    providing the second file handle to an application host process, wherein file data is written to the second file handle;
    running one or more legacy applications on one or more of the application host processes, each of the one or more legacy applications running in a separate application host process;
    restricting privileges and groups of the application host processes so that privileges and groups of each application host process are different than privileges and groups of the one or more legacy applications running on the application host processes; and
    assigning a unique logon identifier to each application host process so that each application host process can only communicate with the application manager process.

2. The method of claim 1, further comprising creating each application host process with a restricted access token.

3. The method of claim 2, further comprising restricting attributes of each application host process using a job object.

4. The method of claim 3, further comprising assigning the unique logon identifier to each application host process via a logon function.

5. The method of claim 1, further comprising assigning the unique logon identifier to each application host process via a logon function.

6. A method for servicing a request on a server to render a document from a file, the method comprising:
    receiving a request for the file;
    processing the request for the file using an application manager process, the application manager process obtaining a first file handle for the file;
    creating a second file handle for the file, the second file handle being a duplicate of the first file handle, the second file handle having restricted access to memory of the server;
    providing the second file handle to an application host process, wherein file data is written to the second file handle;
    activating the application host process from a pool of available processes, the activation of the application host process being controlled by the application manager process, running one or more legacy applications on one or more of the application host processes, each of the one or more legacy applications running in a separate application host process, the available processes in the pool of available processes having each been created with a unique logon identifier, the unique logon identifier permitting the application host process to communicate only with the application manager process;
    executing an application using the application host process to render the document from the requested file, the one or more legacy applications running in the application host process;
    monitoring the application host process using the application manager process;
    detecting when the application host process has abnormally terminated; and
    activating a new application host process when an abnormal termination is detected.

7. The method of claim 6, further comprising terminating the application host process when the application host process remains active for longer than a specified period.

8. The method of claim 6, further comprising:
    sending a message from the application manager process to the application host process at predetermined time intervals; and
    verifying that a response is sent from the application host process to the application manager process for each message sent.

9. The method of claim 8, further comprising terminating the application host process if the response to the message is not received within a predetermined time.

10. The method of claim 6, further comprising monitoring resources in the application host process.

11. The method of claim 10, wherein monitoring resources further comprises selecting the resources from a group consisting of memory usage, input file size, individual file output size, and total file size of all output files.

12. The method of claim 11, further comprising terminating the application host process if a resource exceeds a predetermined value.

13. The method of claim 6, further comprising terminating the application host process if the application host process attempts to launch another process not contained on a process list.

14. The method of claim 6, further comprising terminating the application host process after the application host process has been used to render a predetermined number of documents.

15. The method of claim 6, further comprising preventing the application host process from performing operations from the group consisting of accessing a network and writing to a server registry.

16. A system for running application code on a web server, the system comprising:
    a plurality of application host processes; and
    an application manager process, the application manager process obtaining a first file handle for a file, creating a second file handle for the file, the second file handle being a duplicate of the first file handle, the second file handle having restricted access to memory of the web server, the application manager process further comprising:
        an application host process creation module programmed to create a pool of application host processes and to activate an application host process when required, providing the second file handle to the application host process, wherein file data is written to the second file handle, running one or more legacy applications on one or more of the application host processes, each of the one or more legacy applications running in a separate application host process, the application host process creation module configured to restrict inter-process communication for the pool of application host processes, each application host process in the pool of application host processes prevented from communicating with any other application host process in the pool of application host processes;

an application host process monitor module programmed to monitor attributes of the application host processes and terminate a first application host process when attributes of the first application host process exceed a predetermined limit and activate a new application host process when the first application host process is terminated; and a data marshal module programmed to marshal data between the file and an application host process, the data marshal module marshaling data via a file handle, the file handle having restricted access to the memory and disk of the web server;

wherein each of the plurality of application host processes has a unique logon identifier, the unique logon identifier permitting an application host process to communicate only with the application manager process.

* * * * *